(12) United States Patent
Arhart et al.

(10) Patent No.: US 8,338,539 B2
(45) Date of Patent: *Dec. 25, 2012

(54) TRANSPARENT IONOMERIC FILMS FROM BLENDS OF IONOMERIC COPOLYMERS

(75) Inventors: Richard J. Arhart, Wilmington, DE (US); Geraldine M. Lenges, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 360 days.

This patent is subject to a terminal disclaimer.

(21) Appl. No.: 12/148,637

(22) Filed: Apr. 21, 2008

(65) Prior Publication Data

US 2008/0207834 A1     Aug. 28, 2008

Related U.S. Application Data

(63) Continuation of application No. 11/165,159, filed on Jun. 23, 2005, now abandoned.

(60) Provisional application No. 60/582,563, filed on Jun. 24, 2004.

(51) Int. Cl.
| C08J 3/00 | (2006.01) |
| C08L 33/02 | (2006.01) |
| B32B 27/34 | (2006.01) |
| H01L 31/42 | (2006.01) |

(52) U.S. Cl. ........ 525/198; 525/221; 525/197; 525/191; 264/171.23; 136/251; 136/244

(58) Field of Classification Search .................. 136/243, 136/244, 251; 525/191, 221, 222, 227, 240, 525/197, 198; 126/904, 908; 428/442, 441, 428/523; 264/171.23

See application file for complete search history.

(56) References Cited

U.S. PATENT DOCUMENTS

| 4,082,877 A | 4/1978 | Shadle |
| 4,599,392 A | 7/1986 | McKinney et al. |
| 4,884,814 A * | 12/1989 | Sullivan .................. 473/372 |
| 5,120,791 A | 6/1992 | Sullivan |
| 5,328,959 A | 7/1994 | Sullivan |
| 5,415,937 A | 5/1995 | Cadorniga et al. |
| 5,476,553 A * | 12/1995 | Hanoka et al. ............ 136/251 |
| 5,478,402 A * | 12/1995 | Hanoka ................... 136/251 |
| 5,567,772 A | 10/1996 | Hagman et al. |
| 5,569,712 A * | 10/1996 | Wang et al. .............. 525/123 |
| 5,587,430 A | 12/1996 | Talkowski |
| 5,688,869 A | 11/1997 | Sullivan |
| 5,691,418 A | 11/1997 | Hagman et al. |
| 5,763,062 A | 6/1998 | Smith et al. |
| 5,873,796 A | 2/1999 | Cavallaro et al. |
| 6,114,046 A * | 9/2000 | Hanoka ................... 428/515 |
| 6,187,448 B1 * | 2/2001 | Hanoka et al. ............ 428/515 |
| 6,329,465 B1 | 12/2001 | Takahashi et al. |
| 6,469,102 B1 * | 10/2002 | Sullivan et al. ........... 525/196 |
| 6,660,930 B1 * | 12/2003 | Gonsiorawski ........... 136/251 |
| 6,693,237 B2 * | 2/2004 | Zenko et al. .............. 136/251 |
| 6,743,847 B1 | 6/2004 | Sullivan et al. |
| 2002/0038664 A1 * | 4/2002 | Zenko et al. .............. 136/251 |
| 2003/0000568 A1 * | 1/2003 | Gonsiorawski ........... 136/251 |
| 2004/0144415 A1 * | 7/2004 | Arhart .................... 136/243 |
| 2005/0279401 A1 * | 12/2005 | Arhart et al. ............. 136/251 |
| 2006/0165929 A1 * | 7/2006 | Lenges et al. ............ 428/35.7 |
| 2009/0145475 A1 * | 6/2009 | Lenges ................... 136/251 |

FOREIGN PATENT DOCUMENTS

| EP | 0 432 611 A2 | 6/1991 |
| EP | 0 982 362 A1 | 3/2000 |

OTHER PUBLICATIONS

Du Pont Surlyn Product and Properties Overview.*
PCT International Search Report for International Application No. PCT/US2005/022543 dated Sep. 27, 2005.

* cited by examiner

*Primary Examiner* — Irina Krylova

(57) ABSTRACT

The present invention is a film obtained from a blend of chemically distinguishable copolymers, wherein the film has a light transmission of at least 85%, and/or a haze of less than 6%, and wherein the blend comprises a component copolymer has a secant modulus of less than 15,000 when cast independently into a film.

6 Claims, No Drawings

TRANSPARENT IONOMERIC FILMS FROM BLENDS OF IONOMERIC COPOLYMERS

This application is a continuation of Prior application Ser. No. 11/165,159, filed Jun. 23, 2005 which claims the benefit of U.S. Provisional Application No. 60/582,563, filed Jun. 24, 2004, the entire contents being incorporated herein by reference.

BACKGROUND OF THE INVENTION

1. Field of the Invention

This invention relates to films useful as encapsulants for photovoltaic (solar) cells. This invention particularly relates to films comprising ethylene acid copolymer ionomers useful as encapsulants for photovoltaic cells.

2. Description of the Related Art

In applications where good optical properties are important, it can be a requirement to have a film that is substantially transparent to light. Films useful in applications where optical properties are important may not have other physical or mechanical properties—such as, for example modulus—suitable for use in the desired field of use.

Blends of ionomers have found particular application in golf ball covers. For example U.S. Pat. No. 5,587,430 to DuPont describes an ionomer composition for improved high temperature performance.

U.S. Pat. No. 5,567,772 to DuPont describes an ionomer blend comprising a polymer that is an ethylene/acid copolymer ionomer which is a partially neutralized copolymer of ethylene and methacrylic acid or acrylic acid.

Golf ball covers have been obtained from blends of high acid ionomers with other ionomers. For example U.S. Pat. No. 5,873,796 to Acushnet Company claims a golf ball comprising a core and at least one cover layer comprising a blend of a high acid ionomer formed from an acid copolymer having an acid content of 19 weight percent; and an ionomer formed from an acid copolymer having an acid content of 15 weight percent.

Blends of high and low modulus ionomers for use in a golf ball have been described in U.S. Pat. No. 5,415,937.

U.S. Pat. No. 4,884,814 to Spalding teaches blending a hard ionomer resin with a soft ionomer resin to produce a golf ball cover.

U.S. Pat. No. 5,120,791 to Lisco describes a composition for use in a golf ball said to have enhanced carrying distance.

Other patents of interest that demonstrate the current state of the art in blending of ionomers are U.S. Pat. Nos. 5,688,869, 5,691,418, and 5,328,959.

The teaching of the golf ball related art describes blended compositions suitable for use in a golf ball cover or other parts of a golf ball. It is of note, however, that transparency and haze (optical properties) are not properties that are considered critical or of any influence to golf ball performance or acceptance.

Blending ionomers having a modulus that is acceptable for an encapsulant application with other ionomers having acceptable optical properties can result in optical properties and modulus that are intermediate between the properties of the components. This can be an unsatisfactory result where improved optical properties or modulus are desirable.

It would therefore be desirable to provide an ionomer film that incorporates both the physical and optical properties desirable for use in applications where both physical properties and optical properties of a film are important.

SUMMARY OF THE INVENTION

The present inventors have made the surprising discovery that it is possible to blend ionomers and obtain a film product that is more flexible than would be expected based on the moduli of the component polymers and yet without a sacrifice in the optical clarity that would be expected from blending two chemically distinguishable materials. Indeed, the optical clarity is very close to that of the more clear component in the mixture.

In one embodiment, the present invention is a blend of at least two chemically distinguishable copolymers that are each obtained by copolymerization of ethylene with at least one other comonomer, wherein the at least one other comonomer is an ethylenically unsaturated carboxylic acid, and wherein a film obtained from the blend (a) has a secant modulus of less than about 15,000 psi as measured according to ASTM D882-01 and (b) (i) transmits at least about 85% of incident visible light and/or (ii) has a haze value of equal to or less than about 6% as measured according to ASTM D1003-00.

In another aspect, the present invention is the product that is obtained after melt extrusion of a blend of at least two chemically distinguishable copolymers that are each obtained by copolymerization of ethylene with at least one other comonomer, wherein the at least one other comonomer is an ethylenically unsaturated carboxylic acid, and wherein a film obtained from the blend (a) has a secant modulus of less than about 15,000 psi as measured according to ASTM D882-01 and (b) (i) transmits at least about 85% of incident visible light and/or (ii) has a haze value of equal to or less than about 6% as measured according to ASTM D1003-00.

In a still another aspect, the present invention is a film obtained by extruding, casting, or blowing a blend of at least two chemically distinguishable copolymers that are each obtained by copolymerization of ethylene with at least one other comonomer, wherein the at least one other comonomer is an ethylenically unsaturated carboxylic acid, and wherein a film obtained from the blend (a) has a secant modulus of less than about 15,000 psi as measured according to ASTM D882-01 and (b) (i) transmits at least about 85% of incident visible light and/or (ii) has a haze value of equal to or less than about 6% as measured according to ASTM D1003-00.

In still another aspect, the present invention is a film which has a modulus which is less than would be predicted from a composition weighted average of the moduli of films obtained by casting or blowing from the first copolymer and the second copolymer and further optional copolymers alone.

In another aspect, the present invention is a process for preparing an optically transparent film having a modulus of less than about 15,000 psi as measured according to ASTM D882-01 wherein the film (i) transmits at least about 85% of incident visible light and/or (ii) has a haze value of equal to or less than about 6% as measured according to ASTM D1003-00, the process comprising the step of: blending at least two chemically distinguishable copolymers that are each obtained by copolymerization of ethylene with at least one other comonomer, wherein the at least one other comonomer is an ethylenically unsaturated carboxylic acid.

In a still further aspect the invention is a photovoltaic (solar) cell module that comprises at least one encapsulant layer comprising an optically transparent film, said film comprising a blend of a first copolymer, a second copolymer and optional further copolymers each of said copolymers being chemically distinguishable and being obtained by copolymerization of ethylene each with at least one other comonomer, wherein the at least one other comonomer is independently an ethylenically unsaturated carboxylic acid or derivative thereof, and wherein the film (a) has a secant modulus of less than about 15,000 psi as measured according to ASTM D882-01 and (b) (i) transmits at least about 85% of incident visible light and/or (ii) has a haze value of equal to or less than about 6% as measured according to ASTM D1003-00.

DETAILED DESCRIPTION OF THE INVENTION

By "chemically distinguishable" as applied to two polymeric materials it is meant that the two materials have different monomer compositions in the polymer chain. For example, two ionomers that are copolymers of ethylene and a second acid comonomer are chemically distinguishable for the purposes of the present invention if they have different mole percentages (and/or different weight percentages) of the two comonomers in the chain or, alternatively, they are considered chemically distinct if at least one of the comonomers in one of the copolymers has a distinct chemical identity from either of the comonomers in the other material.

In one embodiment the present invention is an optically transparent film, wherein the film can be obtained from a blend of suitable polymer resins. By optically transparent it is meant that the film of the present invention is at least 85% transparent to light in the visible region of the light spectrum. Optical transparency can be related to the haze of the multilayer laminate film. In one embodiment of the present invention, the haze of the film is not greater than 6%.

In a further embodiment, the present invention is a blend of a first copolymer, a second copolymer and optional further copolymers each of said copolymers being chemically distinguishable and being obtained by copolymerization of ethylene with at least one other comonomer, wherein the at least one other comonomer is an ethylenically unsaturated carboxylic acid, and wherein a film obtained from the blend (a) has a secant modulus of less than about 15,000 psi as measured according to ASTM D882-01 and (b) (i) transmits at least about 85% of incident visible light and/or (ii) has a haze value of equal to or less than about 6% as measured according to ASTM D1003-00.

In the practice of the present invention, the blend or the optically transparent film comprises at least two chemically distinguishable copolymer resins of ethylene and an ethylenically unsaturated carboxylic acid, or a derivative, or an equivalent thereof. For example, ethylene copolymers with acrylic acid and/or methacrylic acid (referred to hereinafter in any combination as (meth)acrylic acid) can be preferred. Derivatives or equivalents of carboxylic acids are well-known to one of ordinary skill in the art and can be used alternatively to, or in addition to, the carboxylic acid comonomer. Such acid derivatives or equivalents, for example, are: esters; anhydrides; acid salts; acid halides; amides; nitrites, and the like. Salts of ethylene/(meth)acrylic acid copolymers (either fully or partially neutralized) are conventionally known as ionomers, and are particularly preferred in the practice of the present invention.

The polymers can be selected based on the optical and physical properties of a film obtained from the individual components. For example, a suitable blend candidate can have a secant modulus of less than about 35,000 psi, preferably less than about 30,000, and more preferably less than about 25,000. Most preferably, the secant modulus of a film obtained from a component of the blend is less than about 20,000. In a much preferred embodiment, the components of the blend are selected such that at least one component, when in combination with the other component(s), will provide the final film with a secant modulus of less than about 15,000.

A component of the blend can also be selected on the basis of its optical properties as measured on a film obtained therefrom. For example, a film obtained from a component of the blend preferably has a percent transmission (% T) of greater than about 85%, more preferably greater than about 87%, even more preferably greater than about 88%, and most preferably greater than about 90%. In a particularly preferred embodiment, the components of the blend are selected such that a film obtained from the blend has a secant modulus of less than about 15,000 and optical transmission of at least about 85%. Preferably a film obtained from a blend of the present invention has a secant modulus of less than about 14,000, and more preferably less than about 13,000. Most preferably, the secant modulus of the film is less than about 12,000 and the optical transmission is greater than about 88%.

A film can be obtained from the blend of the invention by any means known to one skilled in the art, and which may include, without limitation, melt extrusion followed by casting the melt onto a cold surface or using a gas to blow a bubble from the melt that is then cooled and solidified. The means for obtaining a film can also include a process such as dissolution solvent evaporation or precipitation.

The haze of a film of the present invention is preferably less than about 5%, more preferably less than about 4%, and most preferably less than about 3%. It is surprising that a blend can provide a film having optical properties that are on the same order as a monocomponent film. It is generally accepted by those of ordinary skill in the art that ionomers that differ by more than 3 wt % acid are not readily miscible, and can result in haze levels that are undesirable in a film that is intended to have low haze.

The components can be blended in any proportion suitable and appropriate to provide a film that has optical and physical properties that are suitable for use as an encapsulant layer in a solar cell.

A blend of the present invention can be prepared by conventional blending processes such as, for example, dry-blending of pellets, melt-blending, or co-extrusion.

Ionomers useful in the practice of the present invention are copolymers obtained by the copolymerization of ethylene and an ethylenically unsaturated $C_3$-$C_8$ carboxylic acid. Preferably the unsaturated carboxylic acid is either acrylic acid or methacrylic acid. The acid copolymer preferably includes from about 8 wt % to about 20 wt % of the acid, based on the total weight of the copolymer. Ionomers useful herein preferably comprise from about 12 wt % to about 20 wt % acid, more preferably from about 14 wt % to about 19 wt % acid, and most preferably from about 15 wt % to about 19 wt % acid. Less than about 12 wt % acid can result in too low transmittance or too high haze of the optical layers. It is to be understood that in the present invention the acid component described is inclusive of any neutralized acid that exists in the salt form. If the acid is methacrylic acid, the acid copolymer preferably includes from about 15 wt % to about 25 wt % methacrylic acid. In the final blends, the acid groups in the copolymer are highly neutralized to include from about 65 mole % to about 100 mole % of the neutralized acid carboxylate. Conventional ionomers of this type can be obtained commercially from E.I. du Pont de Nemours and Company (DuPont), for example.

In a particularly preferred embodiment of the present invention, two ionomeric components can be combined in a proportion ranging from about 20 wt % Component 1:80 wt % Component 2 to about 60 wt % Component 1:40 wt % Component 2, wherein Component 1 is an ionomer component having a secant modulus of less than about 15,000 and Component 2 is an ionomer component having an optical transmission of at least about 87%.

Conventional ionomers can include, in addition to the ethylene and acid components, a third comonomer component which is an ester of an ethylenically unsaturated carboxylic acid. Conventional ionomers that include a third comonomer are commercially available from DuPont, for example, and can be suitable for use in the practice of the present invention so long as the optical and physical properties are suitable for application in the present invention.

A film of the present invention can be useful in a variety of applications. The film of the present invention can exhibit excellent adhesion to glass as well as to other materials such as, for example, plastic and/or other transparent materials, and thus can be suitable for use in combination with glass, or clear plastic, to make optically clear or transparent laminate articles, laminated windows or safety glass.

EXAMPLES

The Examples and Comparative Examples are presented for illustrative purposes only, and are not intended to limit the scope of the present invention in any manner.

In the following Examples and Comparative Examples the resins used are as follows:

Resin 1—ionomeric resin, 15 wt % methacrylic acid 1.2% zinc ion, Ml of 5.5;
Resin 2—acid copolymer resin, 11.5 wt % acrylic acid, Ml of 1.5;
Resin 3—ionomeric resin, 10 wt % methacrylic acid 0.75% zinc ion, Ml of 4.0.

The expected values (EV) of the modulus was the linear combination that is established by calculating the weight (for EV 1) or mole (for EV 2) average modulus from the moduli of the individual components.

Comparative Example 1

Resin 1 was extruded in a Werner Pfleiderer 30 mm twin-screw extruder. The barrel temperatures were set at 150° C. (rear), 160° C. (center rear), 190° C. (center), 190° C. (front), 190° C. (adaptor), and 190° C. (die). The resin was extruded at approximately 80 amps, 230 RPM, 440 psi and 210° C. melt temperature. A cast film was prepared from the extrudate on a 1.1 D cast film line. The haze of the film was determined according to ASTM D1003-00. The transmittance (% T) was determined using a Varian Cary 5 uv/vis/nir system. The film was scanned from 800 nm to 200 nm, and % T reported at 500 nm. The secant modulus was determined according to ASTM D882-01. The results are given in Table 1.

Comparative Example 2

The procedure of Comparative Example 1 was repeated except that the film was obtained from 100 wt % Resin 2.

Comparative Example 3

The procedure of Comparative Example 1 was repeated except that the film was obtained from 100 wt % Resin 3.

Example 1

The procedure of Comparative Example 1 was repeated except that the 2 mil monolayer film was obtained from a blend of 25 wt % Resin 1 with 75 wt % Resin 3. Haze, secant modulus, and % T are reported in Table 1.

Example 2

The procedure of Example 1 was repeated except that resins 1 and 3 were combined in a ration of 50:50. Haze, secant modulus, and % T are reported in Table 1.

Example 3

The procedure of Example 1 was repeated except that resins 1 and 2 were combined in a ration of 50:50. Haze, secant modulus, and % T are reported in Table 1.

TABLE 1

| Example | Modulus (2 trials) | % Haze | Transmittance (%) | EV 1 | EV 2 |
|---|---|---|---|---|---|
| C1 | 29,302/32,183 | 2.26 | 90.6 | | |
| C2 | 19,935/19,728 | 2.67 | 88.4 | | |
| C3 | 9,957/10,212 | 2.23 | 88.1 | | |
| 1 | 11,757/11,549 | 2.24 | 89.4 | 15,249 | 14,922 |
| 2 | 15,529/14,359 | 2.18 | 88.7 | 20,414 | 19,969 |
| 3 | 22,845/22,659 | 3.53 | 90.1 | 25,287 | 24,968 |

It is evident from the table that the actual modulus values that were obtained from the blends were at or below the values expected on the basis of either weight or mole fraction of components in the blend. However the transmittance numbers were improved over those of the low modulus component. In particular with blend examples 1 and 2, the transmittance that was obtained was close to that of the stiffer component, while the modulus was close to that of the softer component.

All aforementioned patents and patent applications are herein incorporated by reference in their entirety.

While it is apparent that the invention herein disclosed is well calculated to fulfill the objects above stated, it will be appreciated that numerous modifications and embodiments may be devised by those skilled in the art. It is intended that the appended claims cover all such modifications and embodiments as fall within the true spirit and scope of the present invention.

What is claimed is:

1. A process for preparing a transparent solar cell encapsulant film layer material, the process comprising the steps of:
    A. providing a blend composition comprising a zinc ionomer of a first ethylene copolymer ionomer and a zinc ionomer of a second ethylene copolymer ionomer, wherein 1) each of said first ethylene copolymer zinc ionomer and said second ethylene copolymer zinc ionomer is selected from the group consisting of zinc ionomers of copolymers consisting of copolymerized units of ethylene and from 8 wt. % to 20 wt. % of copolymerized units of a $C_3$-$C_8$ ethylenically unsaturated carboxylic acid, based on the weight of the copolymer, and 2) said first ethylene copolymer zinc ionomer and said second ethylene copolymer zinc ionomer have comonomers of different distinct chemical identities or different weight percentages of the comonomers in the polymer chains;
    B. determining the secant modulus of a film obtained from said first ethylene copolymer zinc ionomer alone and a film obtained from said second ethylene copolymer zinc ionomer alone according to ASTM D882-01, wherein the film obtained from said first zinc ionomer has a secant modulus of less than 15,000 psi and the film obtained from said second zinc ionomer has an optical transmission of at least 88%;

C. selecting the proportion of said first ethylene copolymer zinc ionomer and said second ethylene copolymer zinc ionomer such that they are present in said blend composition in amounts within the range of from 50 to 75 wt. % of said first ethylene copolymer zinc ionomer and from 25 to 50 wt. % of said second ethylene copolymer zinc ionomer, based on the total weight of said first and second ethylene copolymer zinc ionomers in the blend composition to form an encapsulant composition; and D. forming said encapsulant composition into a film layer wherein a) the film obtained from said encapsulant composition has a secant modulus less than 15,000 psi as measured according to ASTM D882-01, and the measured value of the secant modulus of the film is less than that predicted from a composition weighted average of the secant moduli of a film obtained from said first ethylene copolymer zinc ionomer alone and a film obtained from said second ethylene copolymer zinc ionomer alone and b) the film obtained from said encapsulant composition transmits at least 88% of incident visible light and has a haze value of equal to or less than 3% as determined according to ASTM D1003-00.

2. A process of claim 1 wherein said second zinc ionomer is an ionomer of a copolymer consisting of copolymerized units of ethylene and from 14 wt. % to 19 wt. % of an ethylenically unsaturated carboxylic acid monomer, based on the total weight of the copolymer.

3. A process of claim 1 wherein the encapsulant film layer is formed by melt extrusion.

4. A process of claim 1 wherein the blend composition additionally comprises at least one additional copolymer selected from the group consisting of copolymers comprising copolymerized units of ethylene and an unsaturated carboxylic acid and ionomers of said copolymers and wherein the measured value of the secant modulus of a film prepared from said blend composition comprising said at least one additional copolymer is less than that predicted from a composition weighted average of the secant moduli of a film obtained from said first ethylene copolymer zinc ionomer alone a film obtained from said second ethylene copolymer zinc ionomer alone and a film obtained from said at least one additional copolymer alone.

5. A photovoltaic cell module comprising at least one encapsulant film layer prepared by the process of claim 1.

6. A laminate structure comprising a glass layer and an encapsulant film layer prepared by the process of claim 1.

* * * * *